Figure 1:
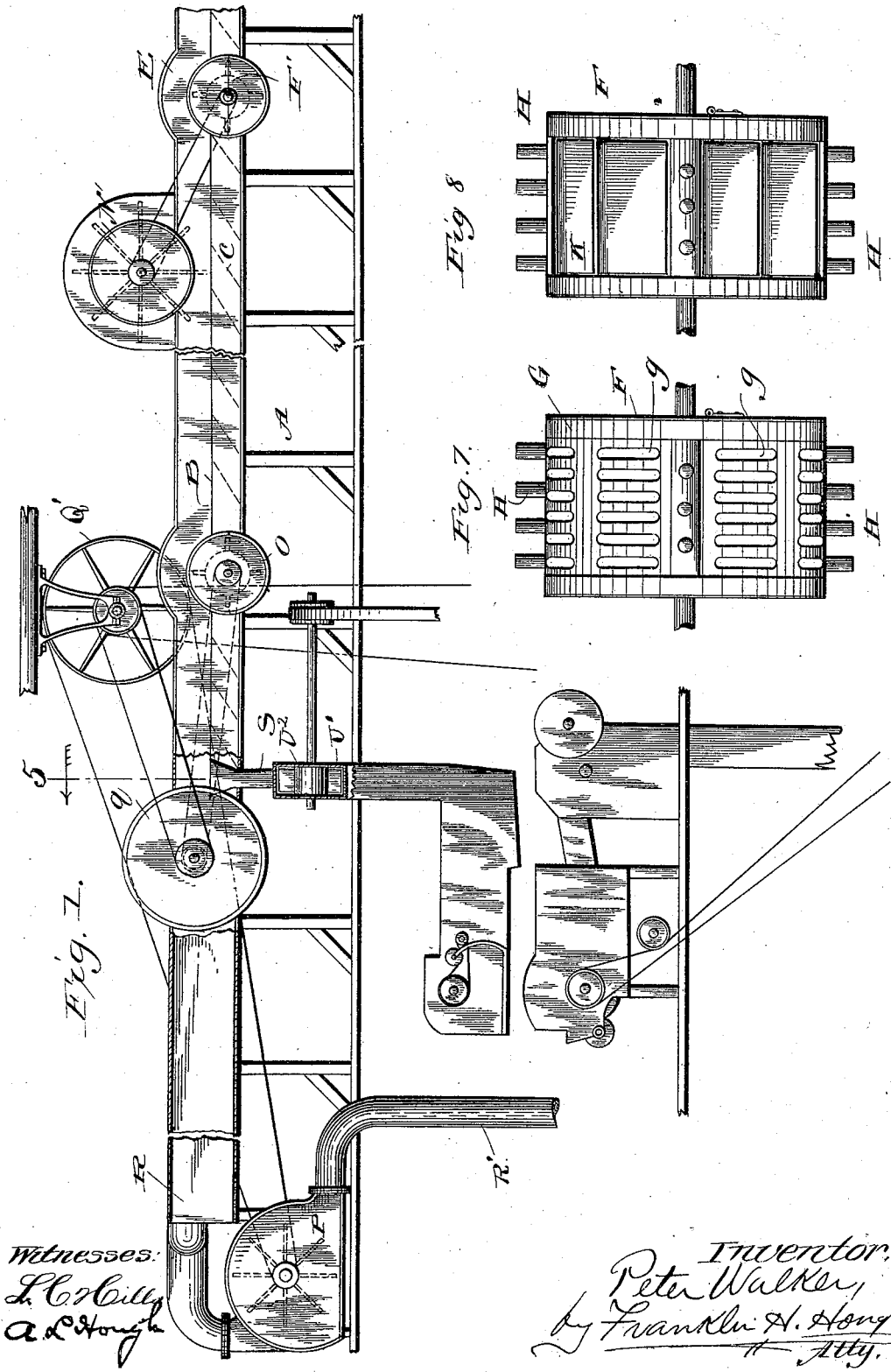

(No Model.) 5 Sheets—Sheet 4.

P. WALKER.
MACHINE FOR CLEANING SEED COTTON.

No. 577,153. Patented Feb. 16, 1897.

Witnesses:
L. C. Hills
A. C. Hough

Inventor:
Peter Walker
by Franklin H. Hough
Atty.

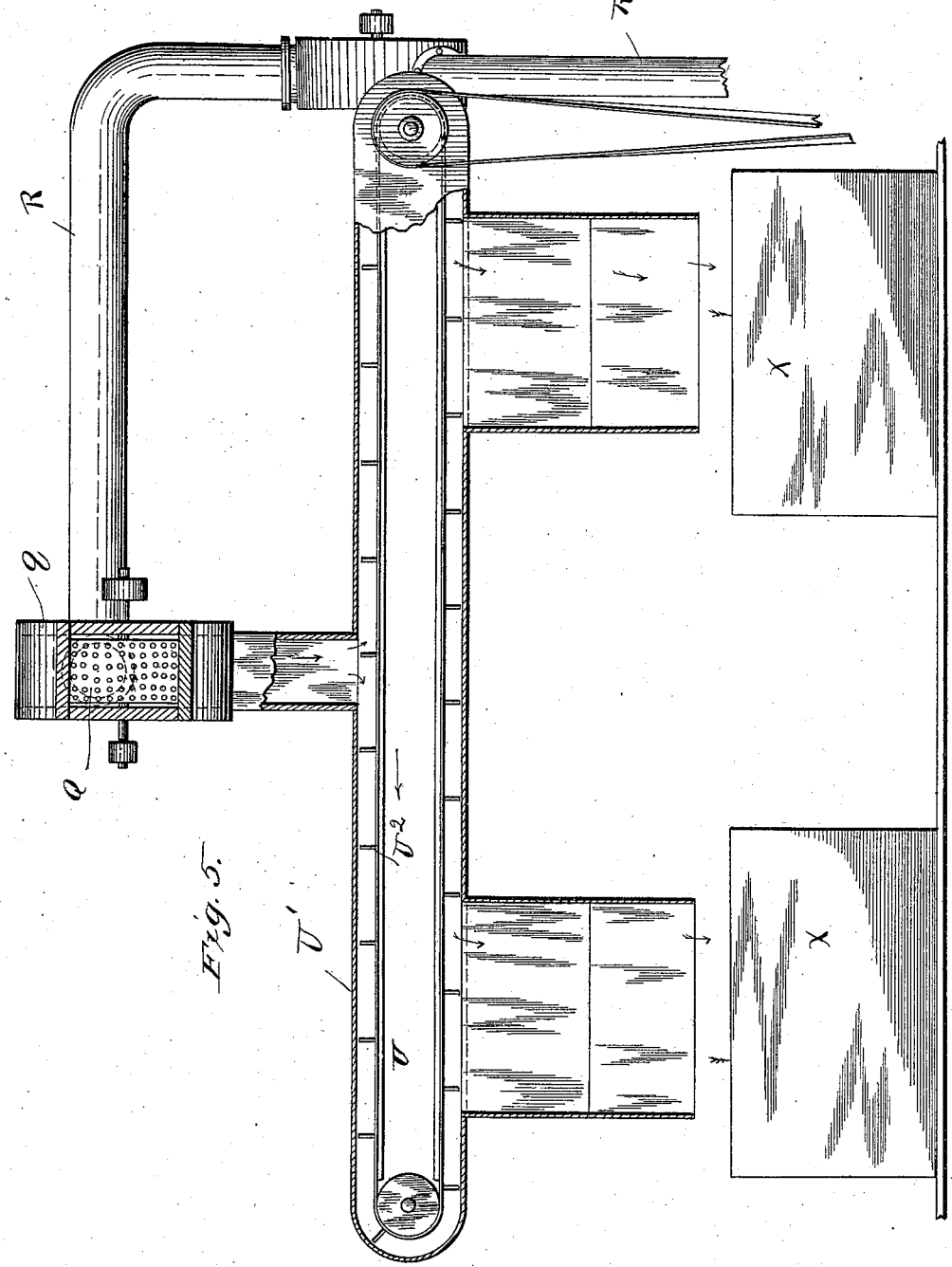

UNITED STATES PATENT OFFICE.

PETER WALKER, OF FRIAR'S POINT, MISSISSIPPI.

MACHINE FOR CLEANING SEED-COTTON.

SPECIFICATION forming part of Letters Patent No. 577,153, dated February 16, 1897.

Application filed June 30, 1896. Serial No. 597,591. (No model.)

*To all whom it may concern:*

Be it known that I, PETER WALKER, a citizen of the United States, residing at Friar's Point, in the county of Coahoma and State of Mississippi, have invented certain new and useful Improvements in Machines for Cleansing Seed-Cotton; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in machines for cleansing seed-cotton from foreign matter and in automatically delivering the cotton containing the seed, freed of dust and various foreign matter, to the gins, the cotton being carried from the beaters by suction to conveyers, by which latter the seed-cotton is delivered on the tables of the gins.

A further part of this invention resides in the peculiar arrangement of the trough into which the cotton is fed from wagons or from a storehouse, the said trough leading to the beater being provided with a series of wires disposed in a horizontal plane and slightly below the center of the trough, the wires being of such a distance apart as to allow foreign substances to pass between the wires, but of such a distance apart as to prevent seed-cotton from passing through or from clogging up the passage-way. The space beneath the series of wires is arranged or divided into a series of compartments, each having inclined partitions between same and hinged doors on the bottom, so as to allow of the ready removal of trash.

A further part of my invention relates to the peculiar construction of the beater-wheels which I employ in my machine, the said wheels, besides having the usual beater-points disposed about the circumference of the wheels in rows, and with the perforated ends, have elongated apertures about the circumference and a series of retaining or curved stationary valves located on the interior of the said wheels or drums, which will allow particles of trash to enter the interior of the drum or beater-wheel through the spaces between the fixed valves, and is prevented from passing out by the centrifugal force of the beater-drum throwing the trash against the broad sides of the said valves.

The invention relates, further, to the provision of a revolving drum located in the circuit of the traveling cotton from the beaters to the revolving screen-wheel, which has a circumference which is perforated, and against the circumference of which drum the seed-cotton is drawn, allowing any dust that may remain in the cotton to pass through into the interior of the drum and out into the atmosphere, while the cotton which strikes against the revolving drum falls onto a conveyer, which will be hereinafter more fully described.

To these ends and to such others as the invention may pertain, the same consists, further, in the novel construction, combination, and adaptation of the parts, as will be hereinafter more fully described and then specifically defined in the appended claims.

I clearly illustrate my invention in the accompanying drawings, which, with the letters of reference marked thereon, form a part of this specification, and in which drawings similar letters of reference indicate like parts throughout the several views, in which—

Figure 2:
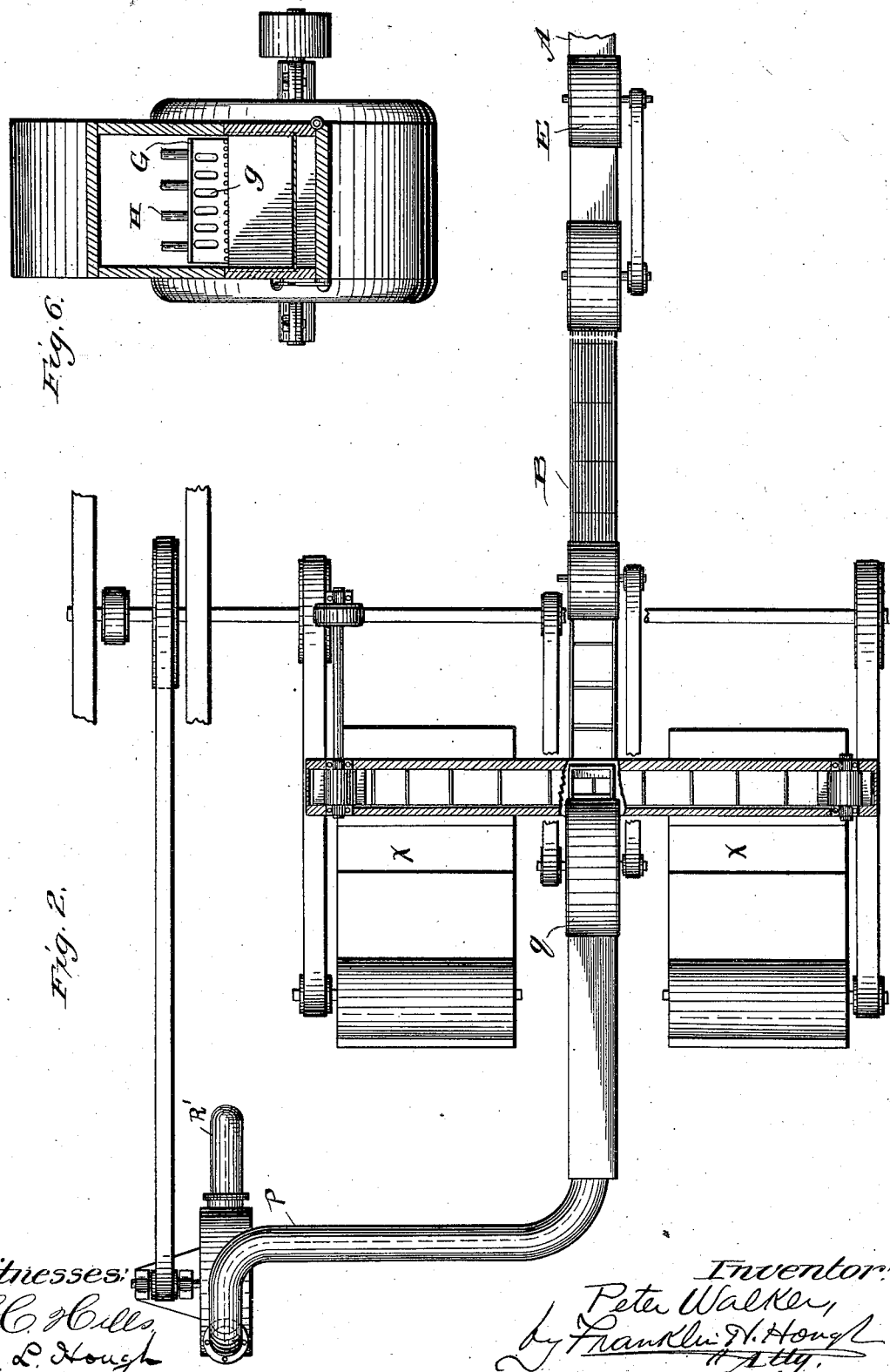
Figure 3:
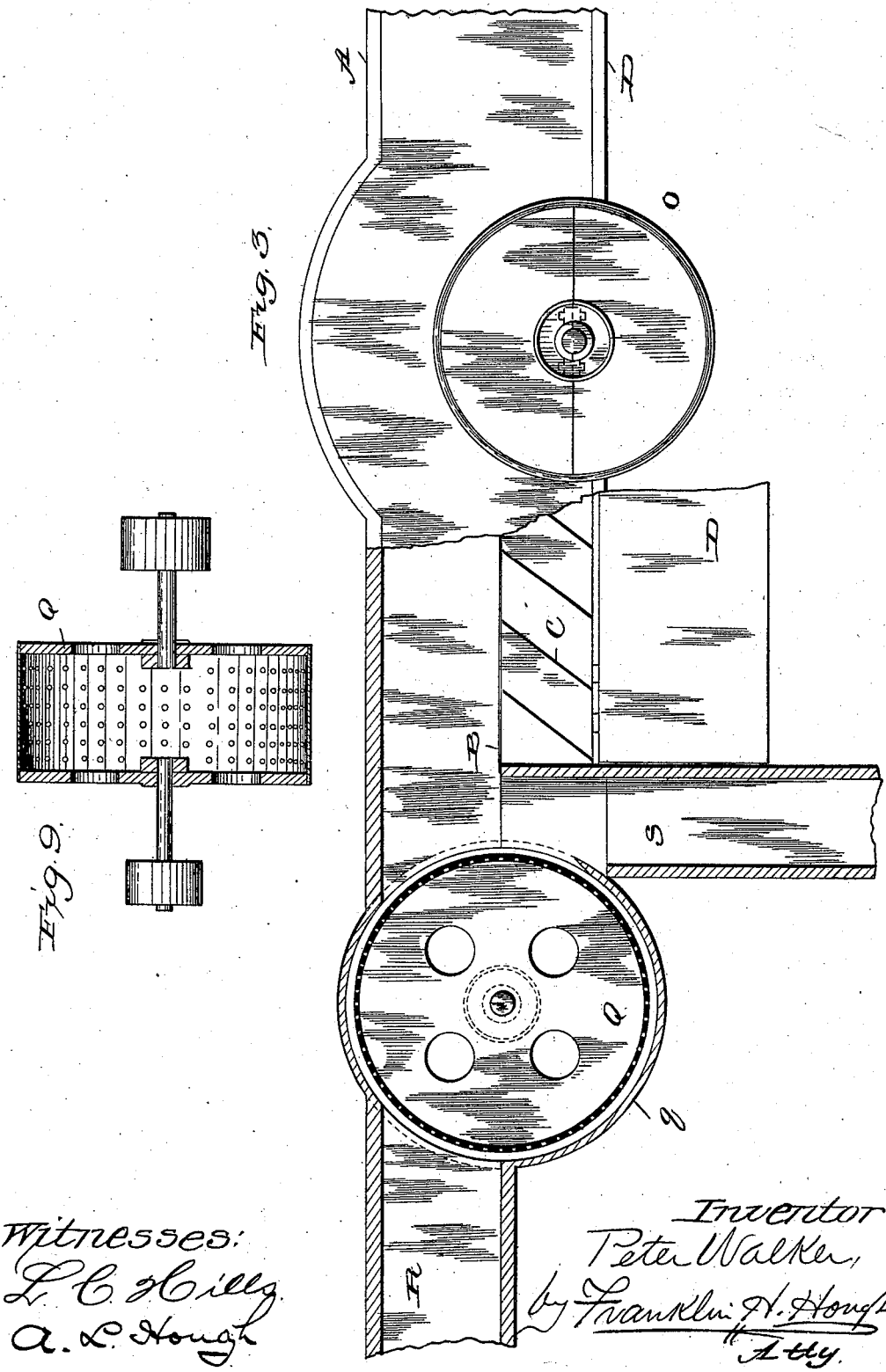
Figure 4:
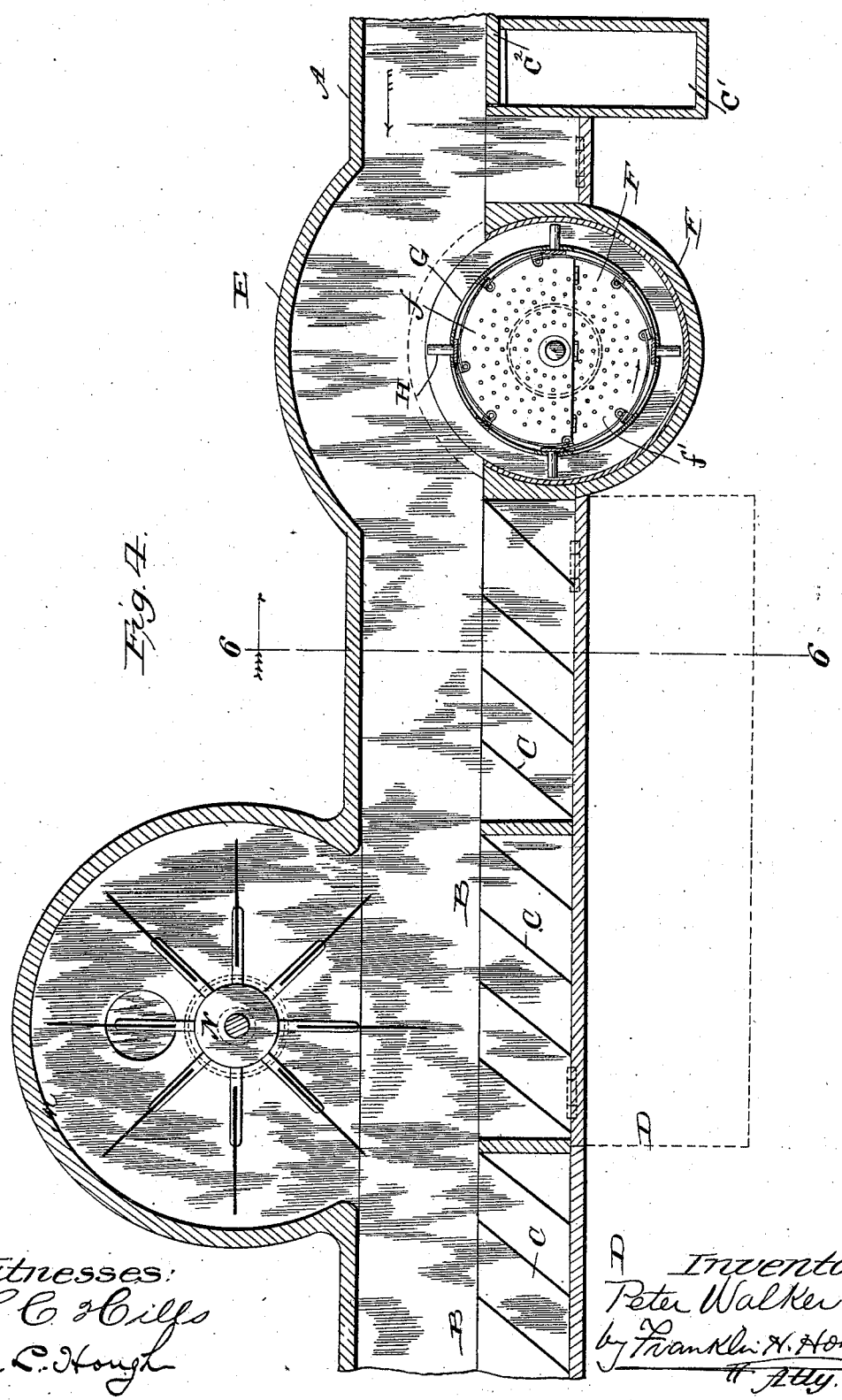

Figure 1 is a side elevation of my machine. Fig. 2 is a top plan view of the same. Fig. 3 is an enlarged detail view of a section of the trough containing a beater-drum, a perforated drum, and the duct leading from the trough to the conveyer, a part of the figure being shown in section. Fig. 4 is an enlarged central vertical sectional view through the trough, a beating and air wheel. Fig. 5 is a side elevation, partially in section, showing the conveyer which carries the cotton to the gin-table. Fig. 6 is a cross-sectional view on line 6 6 of Fig. 4. Fig. 7 is a side elevation of one of the beater-drums. Fig. 8 is a similar view showing the circumference of the wheel or drum removed, showing the retaining-valves carried therein. Fig. 9 is a cross-sectional view through the perforated drum, through which the dust from the cotton is drawn by the suction from the fan.

Reference now being had to the details of the drawings by letter, A designates a trough which has a series of longitudinal wires B horizontally held in and across the interior of the trough at a location preferably below the middle portion thereof, and C C designate a series of partitions which are inclined at an angle and extend between the under sides of the wires B and the bottom wall of the trough, which partitions are provided to prevent the trash being carried along with the suction which carries the seed-cotton toward its destination. The bottom D of the trough, along its horizontal portions, is made up of a series of doors, so as to allow the trash to be removed from the various compartments.

A pocket C' is provided in the trough near a beater-wheel, into which foreign matter, as nails and other articles, is designed to drop as it comes near the rapidly-revolving beater-wheel, and in this pocket is provided a slide $C^2$, by which a portion of the pocket may be shut off, if desired, from communication with the trough. This pocket is also provided with a door at its bottom, whereby the trash may be removed therefrom when desired.

Journaled in the enlarged casing E, forming a part of and communicating with the trough A, is a beater-drum F, which is hollow and has perforated ends $f$, and one end of the said drum has a door $f'$, whereby access may be had to the drum, the door opening, preferably, below the center or bearing portion thereof, and is provided so that trash which accumulates in the drum may be removed. The circumference of this drum is made, preferably, of metal G, having rows of elongated apertures $g$ extending circumferentially about the drum and cross-rows of beater-arms H about its circumference. Secured rigidly to the insides of the ends of the said drum, a slight distance from the inner circumference of the drum, is a series of wings or retainers K, which wings or retainers are slightly curved to conform to the contour of the circumference of the drum.

The ends of each wing or retainer overlap the end of the adjacent retainer, and a sufficient space is left between the two retainers, so as to allow the trash to enter therebetween, which trash enters the elongated apertures above described. The trash once inside of the drum is retained there until removed at the end of the drum through the door in the end of the cylinder. The fast revolutions of the drum will cause the trash to be thrown by centrifugal force against the broad sides of the retainers, thus preventing its being thrown out through the spaces through which it enters, as will be readily understood. The said drum is journaled in such a position as to allow its beater arms or points to extend up above the middle portion of the trough to offer a resistance to the cotton containing the trash to be separated therefrom. Journaled in the walls of the casing M, which communicates with the trough A, is an air-wheel N, the paddles of which extend down into the trough, preferably a distance below the middle portion of the trough, and this air or paddle wheel is rotated by the suction of air produced by a fan-wheel, which is located farther along in communication with the said trough, and which fan-wheel will be hereinafter described. A band $n$ is belted onto the shaft of the wheel N and the shaft of the beating-drum E and imparts motion thereby from the revolving air-wheel to the beater-drum, which latter is designed to revolve in a direction opposite to the incoming seed-cotton, while the wheel N revolves in the direction of the incoming seed, so that the seed-cotton will be thrown violently against the beater-arms, thus separating a part of the trash from the cotton. The cotton after passing the beater-drum passes on through the trough, which may extend, if desired, into an upper story of the gin-house, and is thence extended in a horizontal plane. In the drawings I have shown the trough as continuous, with the inclined portion not shown, the trough merely being broken at the upper and lower portions where the incline leads off. The said horizontal portion of the trough, which is, if desired, in a second story, has another beater-drum O, which is similar in construction to beater-drum F, and is designed to free the seed-cotton further of any foreign matter or trash that may be still retained in the cotton after passing the first beater.

Journaled in the trough, in an enlarged casing $q$ therein, is a screen-wheel Q, which has belted connection with a main driving-wheel Q', and the circumference of this wheel is perforated, as seen plainly in Fig. 9.

P is a fan-wheel mounted in a suitable casing, and has a duct R leading from its interior to the trough A. This fan has belted connection with the main shaft, on which is mounted the wheel Q', and a suitable pipe R' leads from the fan-casing to the outside atmosphere. This fan-wheel is provided to furnish a sufficient suction whereby the seed-cotton is drawn from the storehouse up through the trough by the beater-drums and against the rapidly-revolving perforated circumference of the screen-wheel, at which location the seed-cotton is prevented from passing farther, although the suction from the fan draws the air and dust through the screen-wheel and same is discharged into the atmosphere without the building through the pipe R'.

Leading away from the trough, at a location in advance of the said revolving screens, is a duct S, which leads to the conveyer-box U', in which, near its ends, are journaled shafts, over which travels an endless belt having a series of wings $U^2$, which snugly fit against the upper and lower walls of the interior of the conveyer-box as the conveyer is in operation, thus cutting off any supply of air coming through the conveyer-box from the gin-tables X and up into the duct leading to the trough in advance of the revolving screen-wheel. If air were allowed to pass up through the duct, the suction of the air passing through the trough would not permit the seed-cotton to fall on the conveyer, but as the supply is cut off from passing up, as described, a partial vacuum is formed within the conveyer-box, as the wings fit the walls so snugly, and the seed-cotton falls readily on the conveyer. Of course the seed-cotton is somewhat heavy before it is ginned and is aided by gravity in falling onto the endless carrier. The seed-cotton thus freed from its trash is conveyed to the discharge-openings, which empty onto the gin-tables. It will thus be seen that as the seed-cotton comes with the suction of air against the revolving screen the air will pass through the wheel, and as the wheel revolves rapidly free apertures or perforations are constantly coming in the line of the draft of air, thus rendering my improved screen more effectual than a stationary screen.

By the construction thus described I am enabled to partially dry out or separate any water that is likely to be carried with the cotton-seed into the cleaner and elevator, as the water is allowed to drop through the wire partitions with the trash into the receiving-compartments and out of the way of the cotton that may follow on through the trough.

What I claim to be new, and desire to secure by Letters Patent, is—

1. In an apparatus for cleansing, and conveying seed-cotton to a gin, the combination with the main trough having a beater-drum and an air-wheel journaled therein, a belted connection between same, the said air-wheel adapted to be rotated by a current of air, of a series of wires longitudinally disposed in a horizontal plane in said trough, substantially as shown and described.

2. In an apparatus for conveying and cleansing seed-cotton and carrying same to a gin, the combination with the main trough, the beater-wheel and screen operated in connection therewith, of a series of longitudinal wires arranged in a horizontal plane in said trough, and a series of inclined partitions underneath the wires and the hinged doors in the bottom of the trough, substantially as shown and described.

3. In combination with a trough of a seed-cotton cleansing and cotton-gin feeder, as described, the beater journaled in casings communicating with the main trough, the longitudinal wires and compartments on either side of the beaters, the air-wheel N with belted connection with the beater-wheel and means for conveying the seed-cotton through the trough and for rotating the said wheel N, substantially as shown and described.

4. In a beater-drum, for cleansing and beating seed-cotton, the combination with the drum having perforated ends series of elongated apertures in the circumference thereof, of the stationary wings or retainers within the drum and partially covering said aperture whereby they will allow the trash to pass within the wheel, and means for driving the wheel, substantially as shown and described.

5. In a beater-drum for cleansing and beating seed-cotton, the combination with the drum proper having perforated ends, one of which has a hinged door, the circumference of the wheel provided with series of elongated perforations, of a series of wings or retainers rigidly secured to inner circumference of the drum, the ends of the said wings or retainers overlapping one another, a slight space being left between the said overlapping ends, substantially as shown and described.

6. In a cotton cleaning and beating machine, the combination with the trough, beater-drum and air-wheel as described, of an inclosed screen-wheel with a perforated circumference journaled in an enlarged portion of the trough, a duct leading from the said trough in advance of the said screen-wheel, and a fan-wheel operatively connected with the beater-drum for the purpose of actuating the same for producing a suction through the trough and screen-wheel, substantially as shown and described.

In testimony whereof I affix my signature in presence of two witnesses.

PETER WALKER.

Witnesses:
OLIVA DICKESON,
THOS. MORRISSEY.